(12) United States Patent
Pahle

(10) Patent No.: US 10,865,843 B2
(45) Date of Patent: Dec. 15, 2020

(54) BRAKE PAD FOR A DISC BRAKE

(71) Applicant: KNORR-BREMSE Systeme fuer Nutzfahrzeuge GmbH, Munich (DE)

(72) Inventor: Wolfgang Pahle, Bad Wiessee (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 193 days.

(21) Appl. No.: 16/002,754

(22) Filed: Jun. 7, 2018

(65) Prior Publication Data
US 2018/0283482 A1 Oct. 4, 2018

Related U.S. Application Data

(63) Continuation of application No. PCT/EP2016/080297, filed on Dec. 8, 2016.

(30) Foreign Application Priority Data

Dec. 9, 2015 (DE) .................. 10 2015 121 390
Jan. 18, 2016 (DE) .................. 10 2016 100 693

(51) Int. Cl.
| | | |
|---|---|---|
| F16D 66/02 | (2006.01) | |
| F16D 65/097 | (2006.01) | |
| F16D 66/00 | (2006.01) | |

(52) U.S. Cl.
CPC ....... F16D 66/021 (2013.01); F16D 65/0978 (2013.01); F16D 66/02 (2013.01); *F16D 2066/006* (2013.01)

(58) Field of Classification Search
CPC .... F16D 66/021; F16D 66/022; F16D 66/023; F16D 66/024
See application file for complete search history.

(56) References Cited

U.S. PATENT DOCUMENTS

| | | | |
|---|---|---|---|
| 3,670,300 A * | 6/1972 | Depenheuer | F16D 66/023 340/454 |
| 4,742,326 A | 5/1988 | Gregoire et al. | |
| 5,133,431 A * | 7/1992 | Braun | F16D 66/024 188/1.11 L |
| 2006/0237269 A1 | 10/2006 | Farooq | |
| 2009/0211857 A1 | 8/2009 | Camilo-Martinez et al. | |

(Continued)

FOREIGN PATENT DOCUMENTS

| | | |
|---|---|---|
| CN | 1094799 A | 11/1994 |
| CN | 1854553 A | 11/2006 |
| CN | 102311065 A | 1/2012 |
| CN | 202431816 U | 9/2012 |
| CN | 103791010 A | 5/2014 |

(Continued)

OTHER PUBLICATIONS

English-language abstract for DE 4243558 (1994).*

(Continued)

*Primary Examiner* — Nicholas J Lane
(74) *Attorney, Agent, or Firm* — Crowell & Moring LLP

(57) ABSTRACT

A brake pad of a disc brake, in particular for a disc brake for a utility vehicle, has a backing plate, which bears a friction lining and to which an element that can be moved in relation to the backing plate is connected, and an electrical wear sensor designed in such a way that the wear sensor is arranged on the element that can be moved in relation to the backing plate so that the wear sensor itself can be moved in relation to the backing plate.

15 Claims, 7 Drawing Sheets

(56) References Cited

U.S. PATENT DOCUMENTS

| | | | | |
|---|---|---|---|---|
| 2010/0258384 A1* | 10/2010 | Kreuzeder | ......... | F16D 65/0976 188/1.11 L |
| 2013/0180810 A1 | 7/2013 | Schroeter et al. | | |
| 2015/0362028 A1 | 12/2015 | Sander et al. | | |

FOREIGN PATENT DOCUMENTS

| | | | | | |
|---|---|---|---|---|---|
| DE | 1951745 | A | | 4/1971 | |
| DE | 32 04 305 | C1 | | 9/1983 | |
| DE | 32 30 266 | A1 | | 2/1984 | |
| DE | 4243558 | A1 | * | 6/1994 | ......... F16D 65/0979 |
| DE | 10 2007 049 981 | A1 | | 5/2009 | |
| DE | 10 2013 216 592 | A1 | | 7/2014 | |
| GB | 2 177 170 | A | | 1/1987 | |
| JP | 62-56635 | A | | 3/1987 | |
| RU | 31 267 | U1 | | 7/2003 | |
| RU | 2 492 372 | C2 | | 9/2013 | |
| WO | WO 03/038298 | A2 | | 5/2003 | |
| WO | WO 2009/103499 | A1 | | 8/2009 | |
| WO | WO 2011/076424 | A1 | | 6/2011 | |

OTHER PUBLICATIONS

Russian-language Office Action issued in counterpart Russian Application No. 2018122805/11(036071) dated Sep. 3, 2019 with English translation (six (6) pages).

Chinese-language Office Action issued in counterpart Chinese Application No. 201680078426.6 dated Apr. 2, 2019 with English translation (12 pages).

International Preliminary Report on Patentability (PCT/IB/326 & PCT/IB/373) issued in PCT Application No. PCT/EP2016/080297 dated Jun. 21, 2018, including English translation of document C2 (German-language Written Opinion (PCT/ISA/237) previously filed on Jun. 7, 2018) (seven (7) pages).

Russian-language Office Action issued in counterpart Russian Application No. 2018122805/11(036071) dated Apr. 10, 2019 with English translation (11 pages).

International Search Report (PCT/ISA/210) issued in PCT Application No. PCT/EP2016/080297 dated Mar. 23, 2017 with English translation (six pages).

German-language Written Opinion (PCT/ISA/237) issued in PCT Application No. PCT/EP2016/080297 dated Mar. 23, 2017 (four pages).

Japanese-language Office Action issued in counterpart Japanese Application No. 2018-528067 dated Jul. 10, 2019 with English translation (14 pages).

Portuguese-language Office Action issued in Brazilian Application No. BR112018011143-0 dated Jul. 31, 2020 with partial English translation (five pages).

German-language Office Action issued in German Application No. 10 2016 100 963.9 dated Aug. 11, 2020 (seven (7) pages).

* cited by examiner

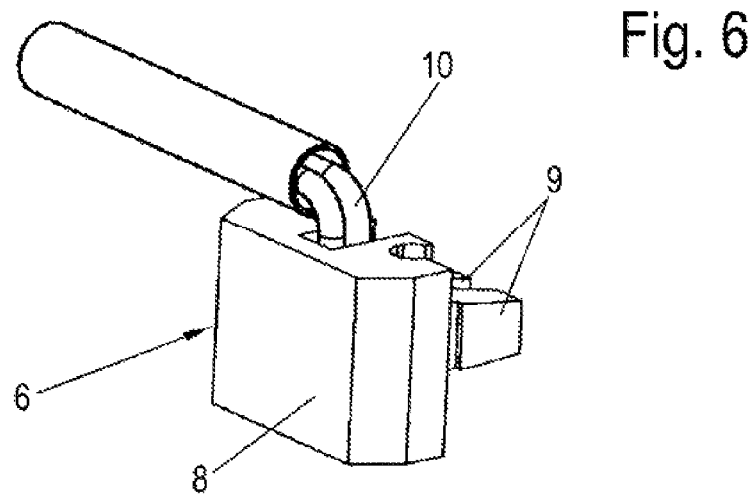
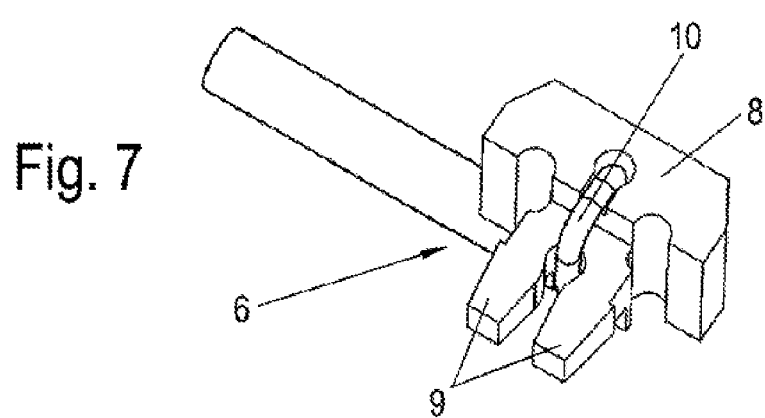
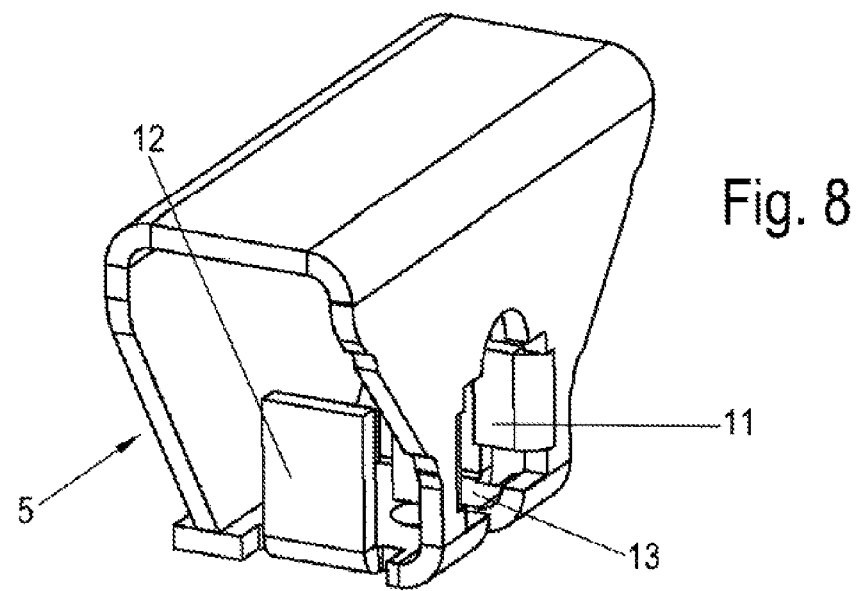

BRAKE PAD FOR A DISC BRAKE

CROSS REFERENCE TO RELATED APPLICATIONS

This application is a continuation of PCT International Application No. PCT/EP2016/080297, filed Dec. 8, 2016, which claims priority under 35 U.S.C. § 119 from German Patent Applications Nos. 10 2015 121 390.7, filed Dec. 9, 2015, and 10 2016 100 693.9, filed Jan. 18, 2016, the entire disclosures of which are herein expressly incorporated by reference.

BACKGROUND AND SUMMARY OF THE INVENTION

The invention relates to a brake pad for a disc brake, in particular for a utility vehicle.

In order to detect a permissible wear limit of the friction lining, it is known to use an electric wear sensor which has a housing made of a high-temperature resistant, non-electrically conducting material in which a contact conductor in the form of a conductor loop is arranged.

This wear sensor is secured in the backing plate of the brake pad, in the vicinity of a cap which is attached to the backing plate and with which a pad securing spring, which is arranged at the edge of the backing plate, is non-detachably secured on the brake pad.

In this context, the wear sensor is plugged into a slot in the backing plate, while the friction lining is hollowed out from the backing plate in the exit region of the wear sensor.

A brake pad of the generic type is disclosed, for example, in DE 10 2007 049 981 A1. In the mounted position in a pad shaft of a brake carrier, this brake pad is mounted sprung in the radial direction with the result that it is moved radially in relation to the brake carrier counter to the spring force which is applied by the pad securing spring in the travel operation.

For operational regions, there is frequent non-uniform, i.e. uneven wear of the friction faces of a vehicle-side brake disc, with the result that grooves are formed. When the brake is released, vibrations can result in radial movement of the brake pad, with brief overshooting of the grooves, as a result of which the very brittle housing material of the wear sensor can be damaged.

Furthermore, said cutout in the friction lining for positioning the wear sensor correspondingly reduces the wear volume, which of course has an adverse effect on the service life of the brake pad.

Moreover, the mounting of the wear sensor in a brake pad according to the prior art is awkward in that, after the pad securing spring has been attached to the backing plate, the wear sensor has to be guided through between the pad securing spring and the backing plate, which is not compatible with optimized efficient fabrication.

The invention is based on the object of further developing a brake pad of the generic type in such a way that the fabrication of the brake pad is simplified with little structural expenditure, and therefore becomes more cost-effective, so that its service life is extended.

This object is achieved by means of a brake pad according to the invention. A brake pad for a disc brake is provided, in particular for a disc brake for a utility vehicle, having a backing plate which bears a friction lining and to which an element is connected which can move in relation to the backing plate, and having an electric wear sensor. The wear sensor is arranged on the element which can move in relation to the backing plate in such a way that it can itself move relatively to the backing plate. The main plane of the backing plate extends perpendicularly with respect to a brake application direction of the pad in a state in which it is installed into a brake. The wear sensor can be movable parallel to this main plane.

As a result of this structural configuration, an entire series of advantages are obtained, which are particularly apparent insofar as the invention can be implemented in an essentially cost-neutral fashion.

It is firstly to be noted that the wear sensor is virtually decoupled from the backing plate or the friction lining. That is to say when vibrations occur owing to travel the friction lining no longer moves correspondingly in a radial direction in the brake so that it is continuously in contact with the same region of the brake disc. The problems described above, which arise from the formation of grooves in the brake disc, can now no longer occur, with the result that the housing of the wear sensor is no longer subject to the risk of damage.

It is preferred here that the wear sensor be arranged on a pad securing spring which forms the movable element.

With this configuration it is also advantageous if, when viewed in a travel direction of the pad securing spring, the wear sensor is secured on said backing plate in such a way that it can be moved in relation thereto. The travel direction is parallel to the plane in which the backing plate extends.

The wear sensor can be attached to the pad securing spring in a way in which various structural solutions are contemplated. These include, for example, the embodiment of a clip which is bent at preferably 90° to an associated brake disc and to which the wear sensor is then secured.

This bent clip to which the wear sensor is attached can also form the securing element.

It is also contemplated to attach the wear sensor to a securing element, to which the pad securing spring is secured to the backing plate.

In particular if the securing element is attached centrally to the backing plate in the circumferential direction of the brake disc, the wear sensor is also secured in this position with which oblique wear of the friction lining applies, if at all, as only a small effect on the response behavior of the wear sensor.

In addition to these purely functional improvements, the invention also gives rise to significantly simplified mounting of the wear sensor, since, after attachment of the pad securing spring, the wear sensor no longer has to be inserted into the backing plate, which involves feeding it in between the pad securing spring and the backing plate.

Moreover, by virtue of positioning the wear sensor outside the friction lining it is possible to dispense with the aforementioned cutout, with the result that the wear volume of the friction lining is completely available, which results in an increase in the service life, with the corresponding cost advantages.

The wear sensor can be connected in a materially joined fashion, for example by welding or soldering, but preferably in a positively locking fashion, to the pad securing spring or to the securing element, for which purpose latching elements which correspond to one another are provided, said latching elements can be composed, as is provided by a further concept of the invention, of latching limbs of the housing of the wear sensor and of undercuts of the securing element or of the bent clip of the pad securing spring, behind which undercuts the latching limbs engage.

As a result of this positive engagement, extremely simple mounting of the wear sensor is possible insofar as the latter only has to be plugged into an opening, for example in the securing element, with compression of the elastic latching limbs which in an end position spread apart, owing to the inherent restoring forces, in such a way that they engage behind the undercuts.

In order to protect the wear sensor, the securing element has two radially oriented clips which are arranged parallel to one another at a distance from one another and which bound the radial pathway when the pad securing spring experiences spring deflection with respect to the backing plate. The result is that the wear sensor does not enter into contact with the backing plate.

In one embodiment, the securing element can also be embodied in the form of a cap.

It is expedient if the wear sensor is embodied as an end wear sensor.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 6 and 7 show a detail of the brake pad, each in various views.

FIG. 8 shows a further detail of the brake pad, illustrated in a perspective view.

DETAILED DESCRIPTION OF THE DRAWINGS

Figure 1:
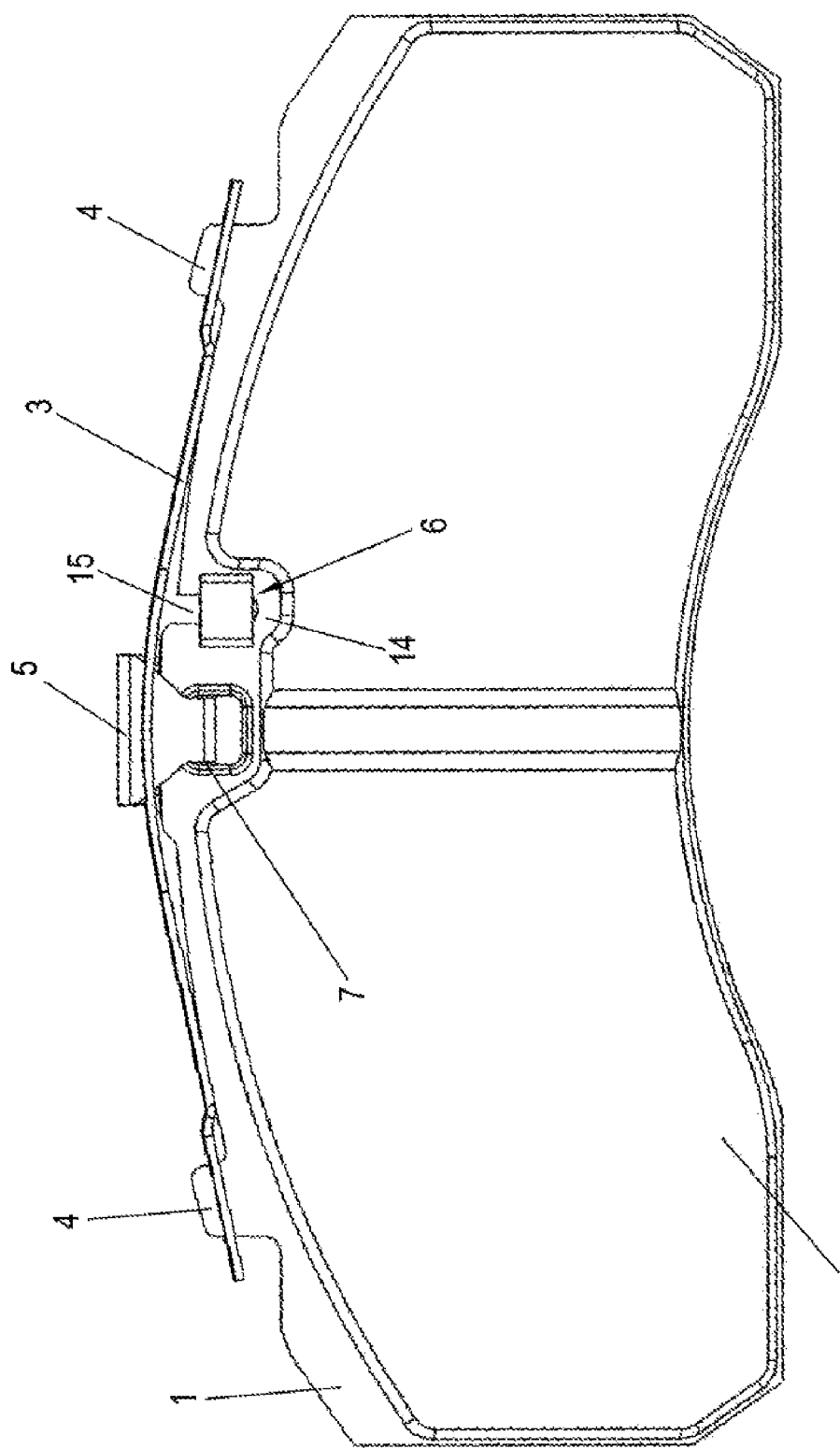
FIG. 1 shows a brake pad according to the prior art in a front view.

FIG. 1 shows a brake pad according to the prior art, with a backing plate 1 and a friction lining 2 attached thereto.

Projections 4 are formed onto a marginal edge of the backing plate 1. The projections 4 pass through slots in a pad securing spring 3, which is embodied as a leaf spring and which is secured to the backing plate 1 by way of a securing element 5 which is embodied here as what is referred to as a cap. The pad securing spring 3 is attached in a radially movable fashion by way of the securing element 5.

A wear sensor 6 is arranged laterally next to the securing element 5. The wear sensor 6 is introduced into a slot 15, open toward the pad securing spring 3, in the backing plate 1, and is positioned in a recess in the friction lining 2.

Figure 2:
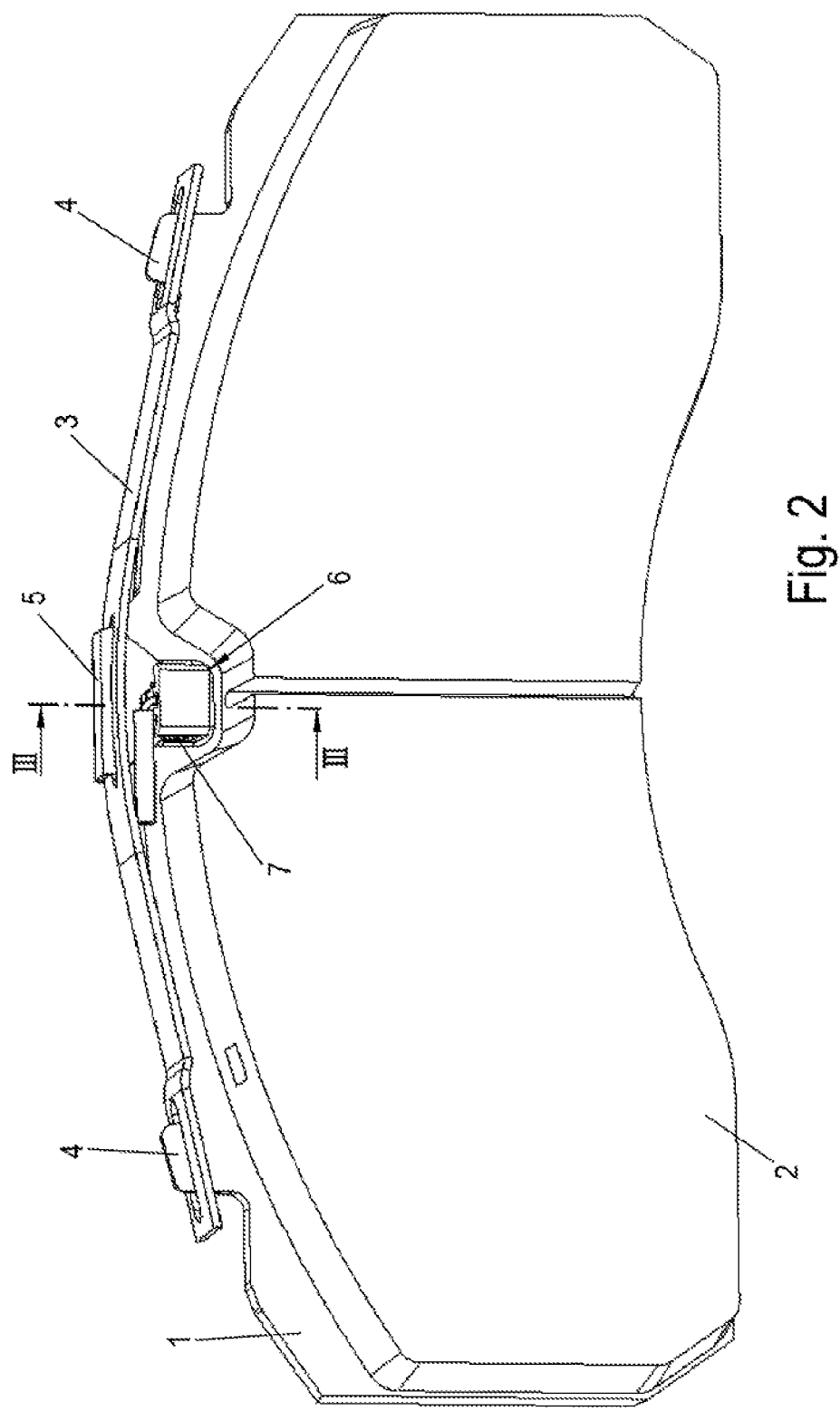
FIG. 2 shows a brake pad according to an embodiment of the invention, also in a front view.

FIG. 2 shows a brake pad according to an embodiment of the invention, which corresponds to the brake pad according to FIG. 1, with the exception of the arrangement of the wear sensor 6.

Here, the wear sensor 6 is attached in the securing element 5, wherein the latter is arranged in the center with respect to the longitudinal extent of the backing plate 1.

Figure 3:
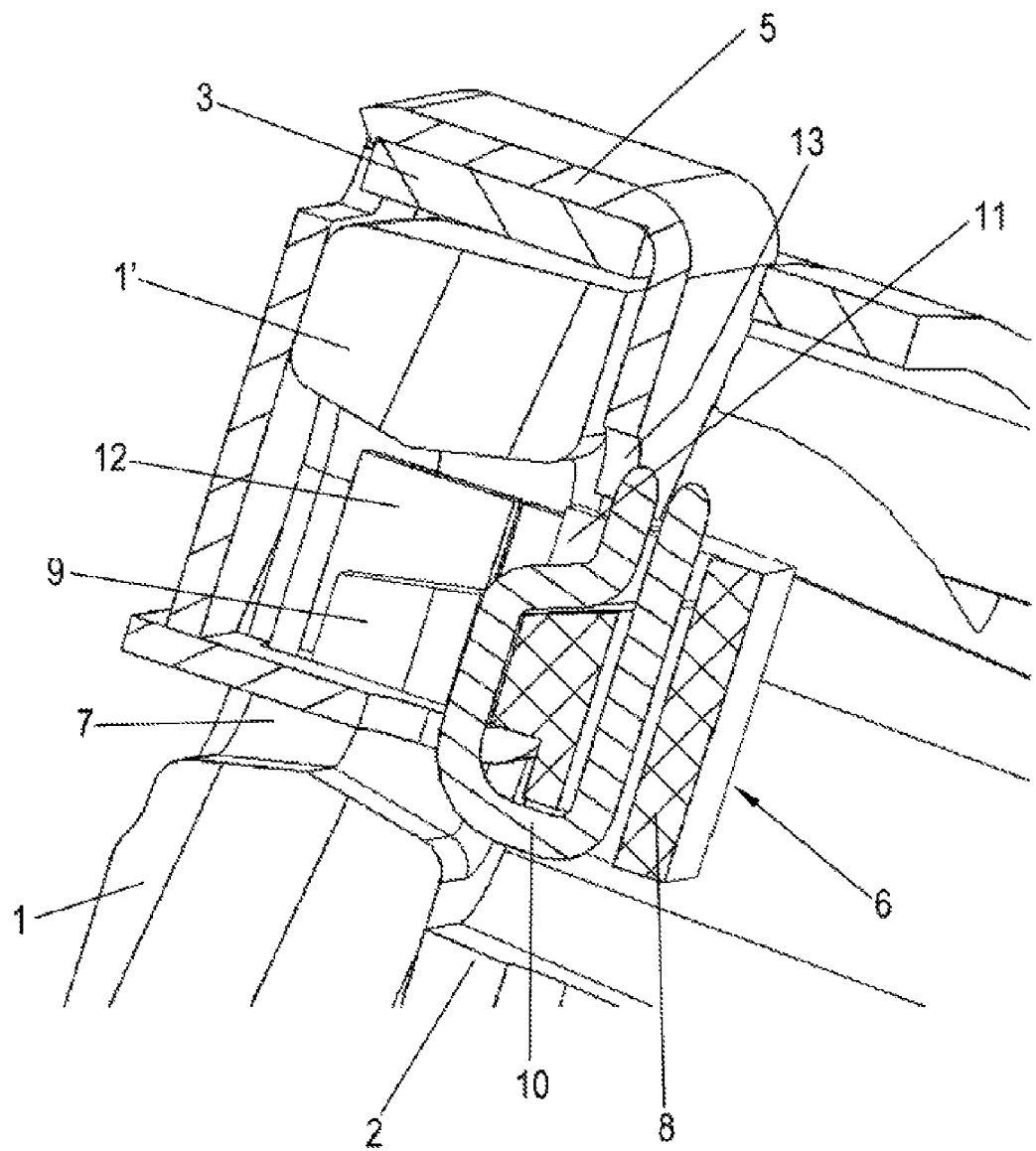
FIG. 3 shows a cross section through a part region of the brake pad according to line III-III in FIG. 2.

FIG. 3 shows a sectional side view of the wear sensor 6 in a mounted position, where it is possible to see that it has a housing 8 in which an electrically conductive contact conductor 10 in the form of a cable is guided in the direction of the friction lining 2, is exposed after the grinding of the contact conductors 10 by said friction lining 2 owing to the brakes, which itself gives rise both to an electrically conductive contact with a brake disc and to a disconnection of the electrically conductive contact conductor 10. The contact with the brake disc, which is usually at ground potential of the associated vehicle, as well as the disconnection which interrupts a flow of current through the contact conductor 10, are sensed by a suitable, in particular simple, electrical/electronic circuit and signaled by means of a suitable display as the reaching of a predefined wear limit.

Figure 4:
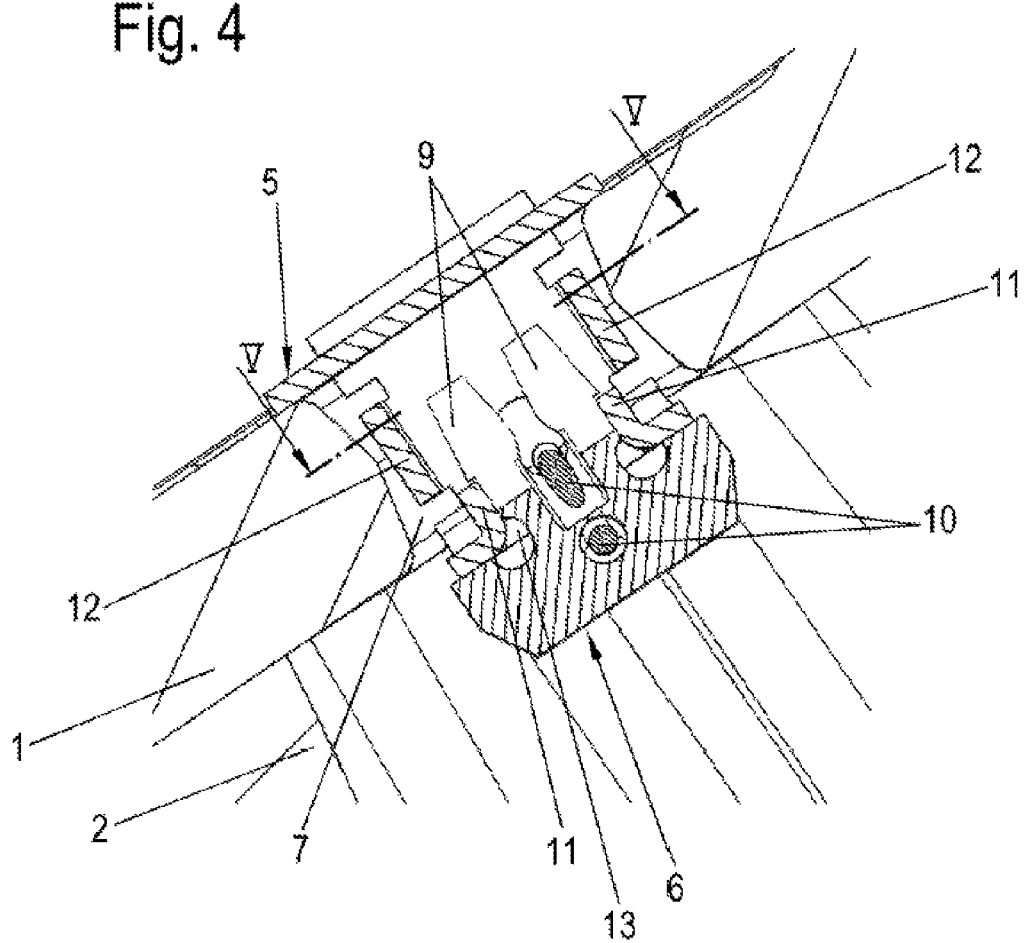
FIG. 4 shows part of the brake pad in a sectional plan view.

As can be clearly seen, in particular, in FIG. 4, the wear sensor 6 has latching limbs 9 which are integrally formed onto the housing 8, are elastically deformable and engage in the mounted position of the wear sensor 6 behind securing device 11 of the securing element 5, with the result that the wear sensor 6 is secured against dropping out. In this context, the wear sensor 6 is fitted with its latching limbs 9 at the front through a cutout 13 in the securing element 5, wherein the housing 8 rests in an end position against the securing devices 11 which are embodied in an angular shape.

Figure 5:
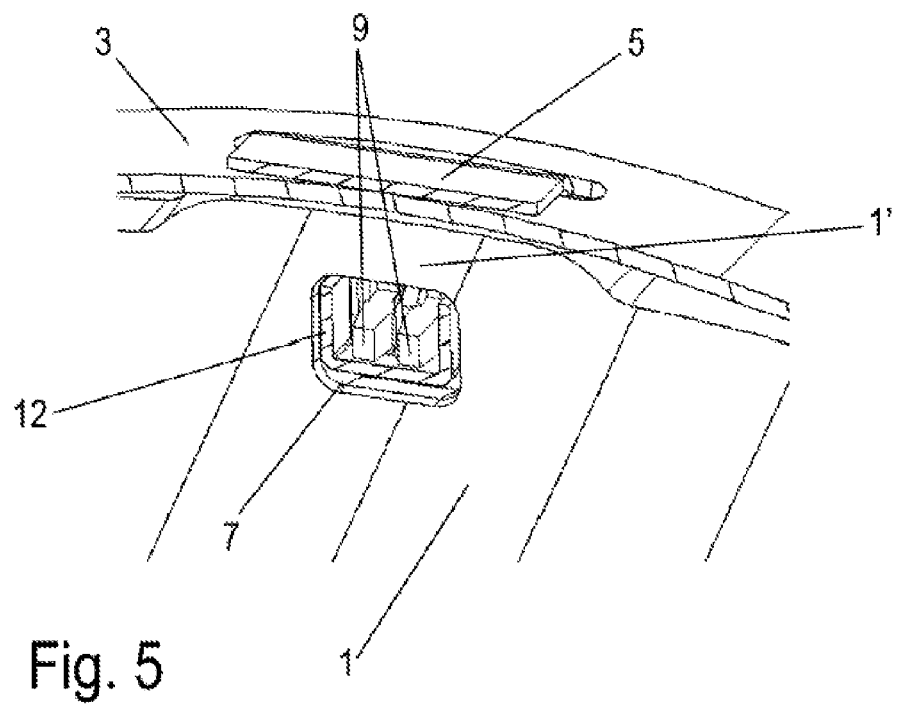
FIG. 5 shows a section through the brake pad according to line V-V in FIG. 4.

FIG. 5 illustrates a sectional rear view of the brake pad, wherein it is apparent that a part region of the securing element 5 passes through an opening 7 in the backing plate 1 which is bound, on its side facing the pad securing spring 3, by a web 1'.

In order to prevent the wear sensor 6 from being pressed against the web 1', and in the process of damaging it in the event of a radial deflection of the pad securing spring 3 and therefore of the securing element 5, clips 12, which impact against the web 1' in the event of corresponding radial movement of the securing element 5 and which are oriented toward the web 1', are provided on the securing element 5, in the area adjacent to the securing devices 11. The height of the clips 12 is greater than the height of the latching limbs 9 or of the adjacent parts of the wear sensor 6.

FIG. 6 illustrates a wear sensor 6, also as in FIG. 7 wherein FIG. 6 represents the front side of the housing 8 which faces the friction lining 2, while FIG. 7 shows the rear side with the integrally formed-on latching limbs 9.

FIG. 8 shows the securing element 5 as a cap as a detail, as is illustrated after mounting on the backing plate 1.

Figure 9:
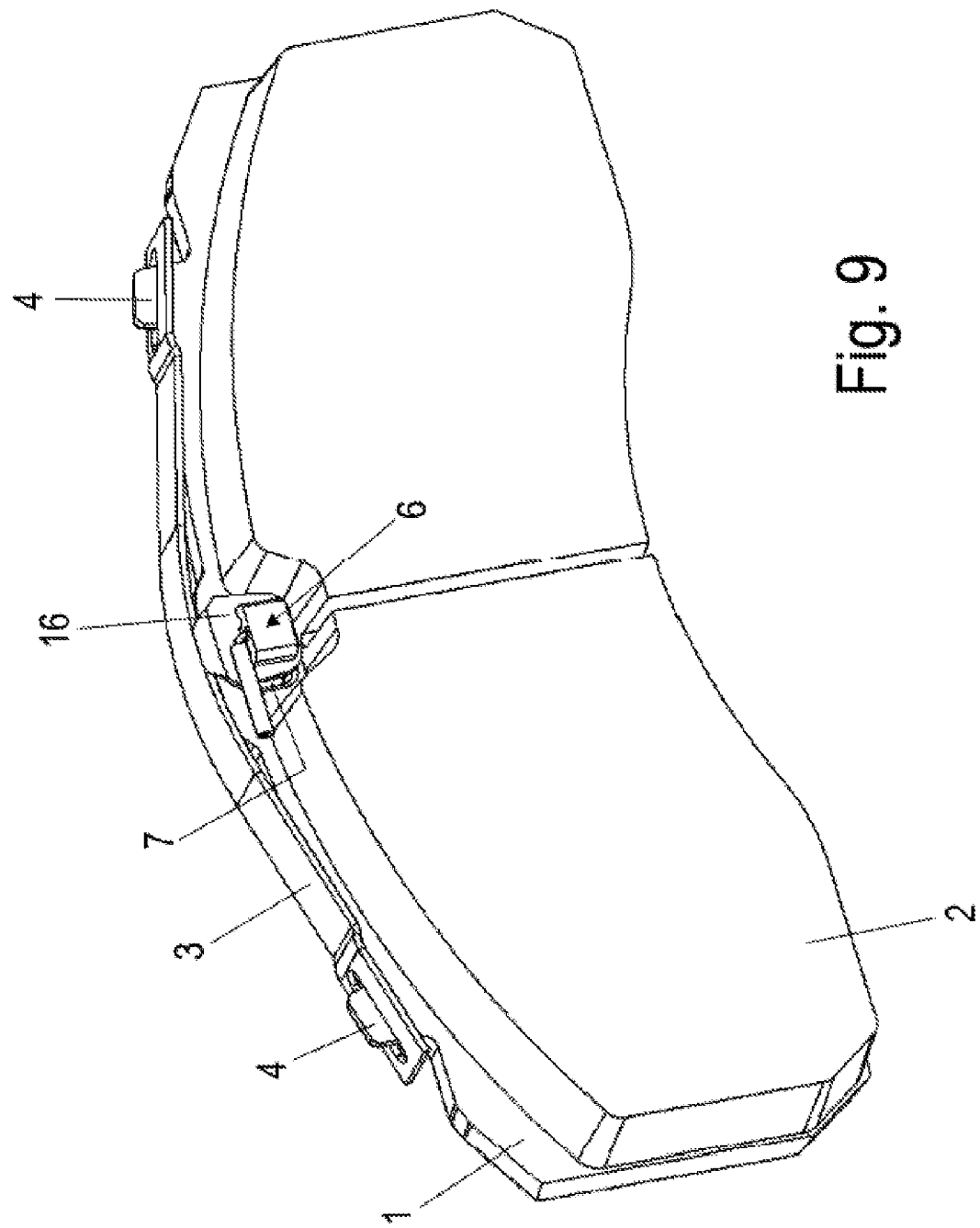
FIG. 9 shows an alternative embodiment of a brake pad according to the invention, also in a front view.
Figure 10:
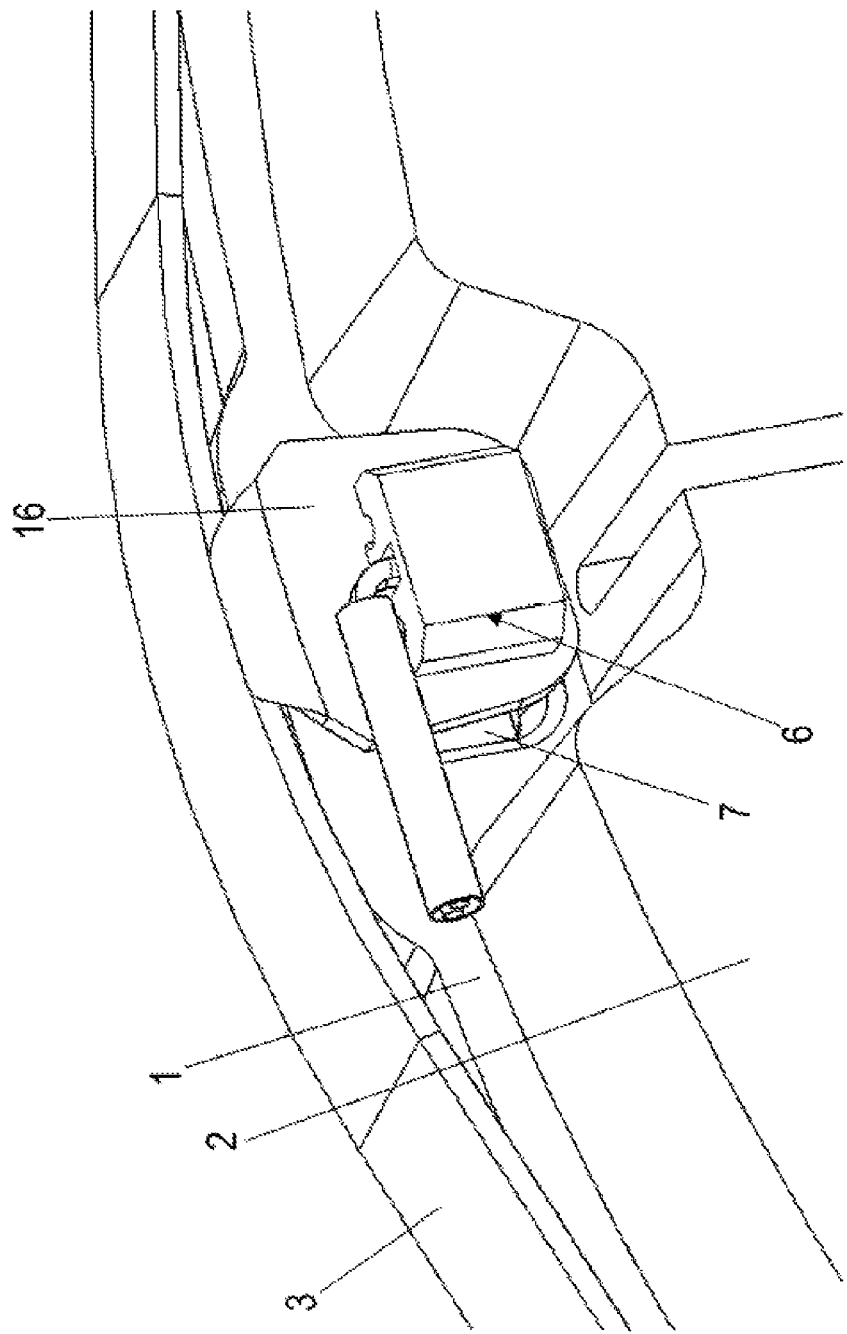
FIG. 10 shows a detail of the brake pad shown in FIG. 9, also in a front view.

FIGS. 9 and 10 show an alternative embodiment variant of a brake pad according to the invention. In this embodiment variant, the wear sensor 6 is secured in a positively locking fashion to the pad securing spring 3.

In this embodiment variant, the pad securing spring 3 is also secured at its ends spaced apart from one another to the projections 4 of the backing plate 1. Instead of the securing element 5 by which the pad securing spring 3 is attached in a radially movable fashion to the backing plate 1, clip 16, which is preferably bent through 90° with respect to an associated brake disc and to which the wear sensor 6 is fastened, preferably in accordance with the attachment to the securing element 5, as has been explained further above, extends from a central region of the pad securing spring 3.

LIST OF REFERENCE NUMBERS 1 backing plate
1' web
2 friction lining
3 pad securing spring
4 projection
5 securing element 6 wear sensor
7 opening
8 housing
9 latching limb
10 contact conductor
11 securing device
12 clip
13 cutout
14 recess
15 slot
16 clip The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake pad for a disc brake, comprising:
   a backing plate which bears a friction lining and to which an element which is movable in relation to the backing plate is connected; and
   an electric wear sensor,
   wherein
   the wear sensor is arranged on the element which, in relation to the backing plate, is movable such that the wear sensor itself is spaced from the backing plate when the backing plate is at rest and is movable in relation to the backing plate,
   the wear sensor is arranged on a pad securing spring which forms the movable element,
   the pad securing spring is entirely or partially secured to the backing plate by a securing element which is movable in relation to the backing plate, and
   the wear sensor is attached in or to the securing element.

2. The brake pad as claimed in claim 1, wherein
when viewed in a travel direction of the pad securing spring, the wear sensor is secured to the backing plate such that the wear sensor is movable in relation thereto.

3. The brake pad as claimed in claim 1, wherein
the wear sensor is secured in a positively locking fashion in or on the securing element or the pad securing spring.

4. The brake pad as claimed in claim 1, wherein
the pad securing spring has a clip which is bent in the direction of the friction lining and/or toward a brake disc to which the wear sensor is attached.

5. The brake pad as claimed in claim 4, wherein
the bent clip to which the wear sensor is attached forms a securing element.

6. The brake pad as claimed in claim 1, wherein
the securing element has a cutout through which the wear sensor is plugged into the securing element, and
a housing of the wear sensor adjoins on the side of the securing element which is assigned to the friction lining.

7. The brake pad as claimed in claim 1, wherein
the wear sensor is latched to the securing element of the pad securing spring.

8. The brake pad as claimed in claim 1, wherein
the wear sensor has latching elements which correspond to undercuts of the securing element or of the pad securing spring.

9. The brake pad as claimed in claim 8, wherein
the latching elements of the wear sensor are composed of elastically deformable latching limbs.

10. The brake pad as claimed in claim 9, wherein
the latching limbs engage behind a securing device of the securing element.

11. The brake pad as claimed in claim 10, wherein
the securing element has at least one clip which limits the travel of the pad securing spring.

12. The brake pad as claimed in claim 11, wherein
the clip is positioned in an overlapping region of a web of the backing plate, which web bounds an opening in the backing plate.

13. The brake pad as claimed in claim 12, wherein
each securing device is assigned an adjacent clip.

14. The brake pad as claimed in claim 1, wherein
a cutout is arranged centrally with respect to a length of the securing element on the side which is assigned to the friction lining.

15. The brake pad as claimed in claim 1, wherein
the securing element is embodied in the form of a cap.

* * * * *